United States Patent
Kakizaki et al.

(10) Patent No.: US 9,748,727 B2
(45) Date of Patent: Aug. 29, 2017

(54) PRELIMINARY IONIZATION DISCHARGE DEVICE AND LASER APPARATUS

(71) Applicant: Gigaphoton Inc., Tochigi-ken (JP)

(72) Inventors: Kouji Kakizaki, Oyama (JP); Hiroaki Tsushima, Oyama (JP); Junichi Fujimoto, Oyama (JP); Natsushi Suzuki, Oyama (JP); Hisakazu Katsuumi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 14/956,709

(22) Filed: Dec. 2, 2015

(65) Prior Publication Data

US 2016/0172817 A1 Jun. 16, 2016

Related U.S. Application Data

(63) Continuation of application No. PCT/JP2014/068430, filed on Jul. 10, 2014.

(30) Foreign Application Priority Data

Jul. 10, 2013 (JP) ................. 2013-144580

(51) Int. Cl.
*H01S 3/0977* (2006.01)
*H01S 3/0971* (2006.01)
(Continued)

(52) U.S. Cl.
CPC ........ *H01S 3/09713* (2013.01); *H01S 3/0384* (2013.01); *H01S 3/08009* (2013.01); *H01S 3/0977* (2013.01)

(58) Field of Classification Search
CPC ............... H01S 3/0384; H01S 3/09713; H01S 3/09716; H01S 3/0977; H01S 3/09775
(Continued)

(56) References Cited

U.S. PATENT DOCUMENTS 5,337,330 A 8/1994 Larson
5,719,896 A 2/1998 Watson
(Continued)

FOREIGN PATENT DOCUMENTS

JP H08-502145 A 3/1996
JP H10-056220 A 2/1998
(Continued)

OTHER PUBLICATIONS

International Search Report & Written Opinion issued in Application No. PCT/JP2014/068430, mailed Sep. 30, 2014.
(Continued)

*Primary Examiner* — Tod T Van Roy
(74) *Attorney, Agent, or Firm* — Studebaker & Brackett PC

(57) ABSTRACT

A preliminary ionization discharge device used in a laser chamber of a laser apparatus using preliminary ionization includes a dielectric pipe; a preliminary ionization inner electrode provided inside the dielectric pipe; and a preliminary ionization outer electrode provided outside the dielectric pipe. The preliminary ionization outer electrode includes: a contact plate part configured to contact the dielectric pipe; and an elastic part configured to exert a force in a direction in which the contact plate part pushes the dielectric pipe.

18 Claims, 14 Drawing Sheets

(51) Int. Cl.
*H01S 3/038* (2006.01)
*H01S 3/08* (2006.01)

(58) Field of Classification Search
USPC .............. 372/29.013, 38.05, 82, 86, 87
See application file for complete search history.

(56) References Cited

U.S. PATENT DOCUMENTS

| | | |
|---|---|---|
| 6,654,402 B1 | 11/2003 | Kakizaki et al. |
| 2001/0050937 A1 | 12/2001 | Hori et al. |
| 2003/0042436 A1 | 3/2003 | Hori et al. |
| 2004/0037338 A1* | 2/2004 | Morton ............... G03F 7/70025 372/55 |

FOREIGN PATENT DOCUMENTS

| | | |
|---|---|---|
| JP | H10-242553 A | 9/1998 |
| JP | 2980985 B2 | 11/1999 |
| JP | 2001-007424 A | 1/2001 |
| JP | 2001-044544 A | 2/2001 |
| JP | 2001-332786 A | 11/2001 |
| JP | 3359838 B2 | 12/2002 |
| JP | 2003-152249 A | 5/2003 |
| JP | 3428632 B2 | 7/2003 |
| JP | 4104935 B2 | 6/2008 |
| JP | 4367886 B2 | 11/2009 |

OTHER PUBLICATIONS

International Search Report & Written Opinion issued in Application No. PCT/JP2014/068430, dated Sep. 30, 2014.

\* cited by examiner

FIG. 11A
FIG. 11B
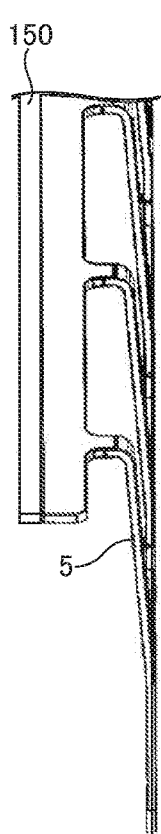
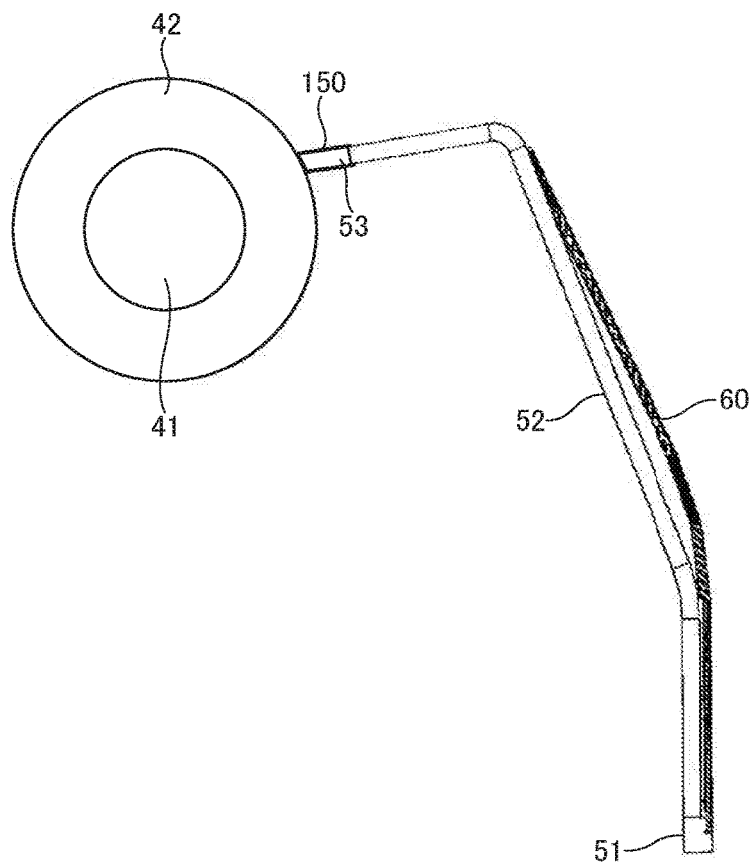

PRELIMINARY IONIZATION DISCHARGE DEVICE AND LASER APPARATUS

CROSS-REFERENCES TO RELATED APPLICATIONS

This application claims the benefit of Japanese Patent Application No. 2013-144580, filed Jul. 10, 2013, which is incorporated herein by reference.

BACKGROUND

1. Technical Field

The present disclosure relates to a preliminary ionization discharge device and a laser apparatus.

2. Related Art

The miniaturization and increased levels of integration of semiconductor integrated circuits have led to a demand for increases in the resolutions of semiconductor exposure apparatuses (hereinafter referred to as "exposure apparatus"). Accordingly, advances are being made in the reduction in the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

In a next generation exposure technology, immersion exposure has been studied, for reducing the apparent wavelength of an exposure light source by filling the space between the projection lens of an exposure apparatus and a wafer with a liquid, and changing the refractive index of the space. In the case where immersion exposure is carried out using an ArF excimer laser apparatus as the exposure light source, the wafer is irradiated with ultraviolet light at a wavelength of 134 nm in the water. This technology is referred to as ArF immersion exposure or ArF immersion lithography.

The spectral width of the spontaneous oscillation of a KrF or ArF excimer laser apparatus is as wide as 350 to 400 pm. Therefore, when the projection lens of this apparatus is used, chromatic aberration occurs, and consequently the resolution is dropped. It is therefore necessary to narrow the spectral line width of the laser beam emitted from the gas laser apparatus to the extent that the chromatic aberration is negligible. Hereinafter the spectral line width will be referred to as "spectral width." Accordingly, the spectral width has been narrowed by providing a line narrowing module (LNM) having line narrowing elements such as an etalon and a grating in the laser resonator of the gas laser apparatus. A laser apparatus having a narrowed spectral width in this manner is referred to as a line narrowing laser apparatus.

CITATION LIST

Patent Literature

PTL1: Japanese Patent Application Laid-Open No. 2001-7424
PTL2: Japanese Patent Application Laid-Open No. HEI10-242553
PTL3: Japanese Patent No. 3428632
PTL4: Japanese Patent No. 2980985
PTL5: Japanese Patent No. 3359838
PTL6: Japanese Patent No. 4104935
PTL7: Japanese Patent No. 4367886

SUMMARY

A preliminary ionization discharge device used in a laser chamber of a laser apparatus using preliminary ionization may include a dielectric pipe; a preliminary ionization inner electrode provided inside the dielectric pipe; and a preliminary ionization outer electrode provided outside the dielectric pipe. The preliminary ionization outer electrode may include a contact plate part configured to contact the dielectric pipe; and an elastic part configured to exert a force in a direction in which the contact plate part pushes the dielectric pipe.

A laser apparatus may include a laser chamber configured to contain laser gas; a pair of discharge electrodes provided in the laser chamber; and a preliminary ionization discharge device including a dielectric pipe, a preliminary ionization inner electrode provided inside the dielectric pipe, and a preliminary ionization outer electrode provided outside the dielectric pipe. The preliminary ionization outer electrode may include a contact plate part configured to contact the dielectric pipe; an elastic part configured to exert a force in a direction in which the contact plate part pushes the dielectric pipe; and an additional elastic part configured to exert a force in the direction in which the contact plate part pushes the dielectric pipe.

BRIEF DESCRIPTION OF THE DRAWINGS

Hereinafter, selected embodiments of the present disclosure will be described with reference to the accompanying drawings.

FIG. 11A is an explanatory drawing showing the preliminary ionization electrode part according to Embodiment 6 of the present disclosure;

FIG. 11B is an explanatory drawing showing the preliminary ionization electrode part according to Embodiment 6 of the present disclosure;

DESCRIPTION OF EXEMPLARY EMBODIMENTS

Figure 1A:
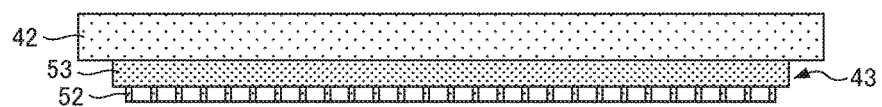
FIG. 1A is an explanatory drawing showing a preliminary ionization electrode part.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

Table of Contents
1. Description of terms
2. Laser apparatus
2.1 Problem
2.2 Configuration
2.3 Operation
2.4 Others
3. Preliminary ionization discharge part
3.1 Embodiment 1
3.2 Embodiment 2
3.3 Embodiment 3
3.4 Embodiment 4
3.5 Embodiment 5
3.6 Embodiment 6
4. Charge and discharge circuit 1. Description Of Terms Terms used in the present disclosure will be defined as follows. "Optical path" means a path through which a laser beam passes. The optical path may be an axis passing through an approximate center of the beam-cross section of a laser beam along the traveling direction of the laser beam.

2. Laser Apparatus 2.1 Problem

In a KrF or ArF excimer laser apparatus, preliminary ionization is performed by, for example, a corona discharge, before a main discharge for gas excitation is generated. This preliminary ionization is performed in a preliminary ionization discharge part. The preliminary ionization discharge part includes a cylindrical dielectric pipe, a preliminary ionization inner electrode, and a preliminary ionization outer electrode. Here, the preliminary ionization inner electrode is provided in the cylinder of the dielectric pipe, and the outer side of the dielectric pipe contacts the preliminary ionization outer electrode. The details of the preliminary ionization discharge part will be described later. In addition, the preliminary ionization discharge part may be referred to as "preliminary ionization discharge device" herein.

Figure 1B:
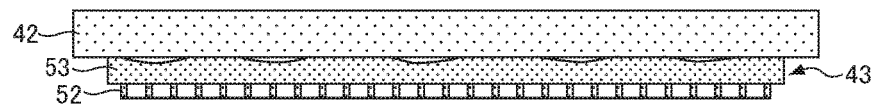
FIG. 1B is an explanatory drawing showing a preliminary ionization electrode part.

The preliminary ionization outer electrode in the preliminary ionization discharge part is abraded by repeatedly generating, for example, corona discharges. However, the amount of ablation is not uniform over the electrode, and therefore the distance between the dielectric pipe and the preliminary ionization outer electrode may be partly increased in spots. To be more specific, when the preliminary ionization outer electrode is not abraded yet, a dielectric pipe 42 and a contact plate part 53 of a preliminary ionization outer electrode 43 are arranged to contact one another as shown in FIG. 1A. However, as the corona discharges are repeatedly generated in the preliminary ionization discharge part, the preliminary ionization outer electrode 43 is unevenly ground as shown in FIG. 1B, and therefore large gaps are randomly created between the dielectric pipe 42 and the preliminary ionization outer electrode 43. When the large gaps are randomly created between the dielectric pipe 42 and the preliminary ionization outer electrode 43 as described above, the subsequent main discharge will not be stably generated. This may cause the properties of a pulsed laser beam such as the energy stability to deteriorate, or may cause the beam profile shape to be different from a desired shape. As a result, the laser chamber needs to be replaced. In this case, it is not preferred that the interval for which the laser chamber is replaced is short, because the running cost is increased, and the operation of the apparatus needs to be stopped for the replacement.

Therefore, a durable preliminary ionization discharge part or preliminary ionization discharge device is desirable, which can prevent large gaps from being created between the dielectric pipe and the preliminary ionization outer electrode even if preliminary ionization is repeatedly performed, and can perform the preliminary ionization for a long period of time.

2.2 Configuration

Figure 2:
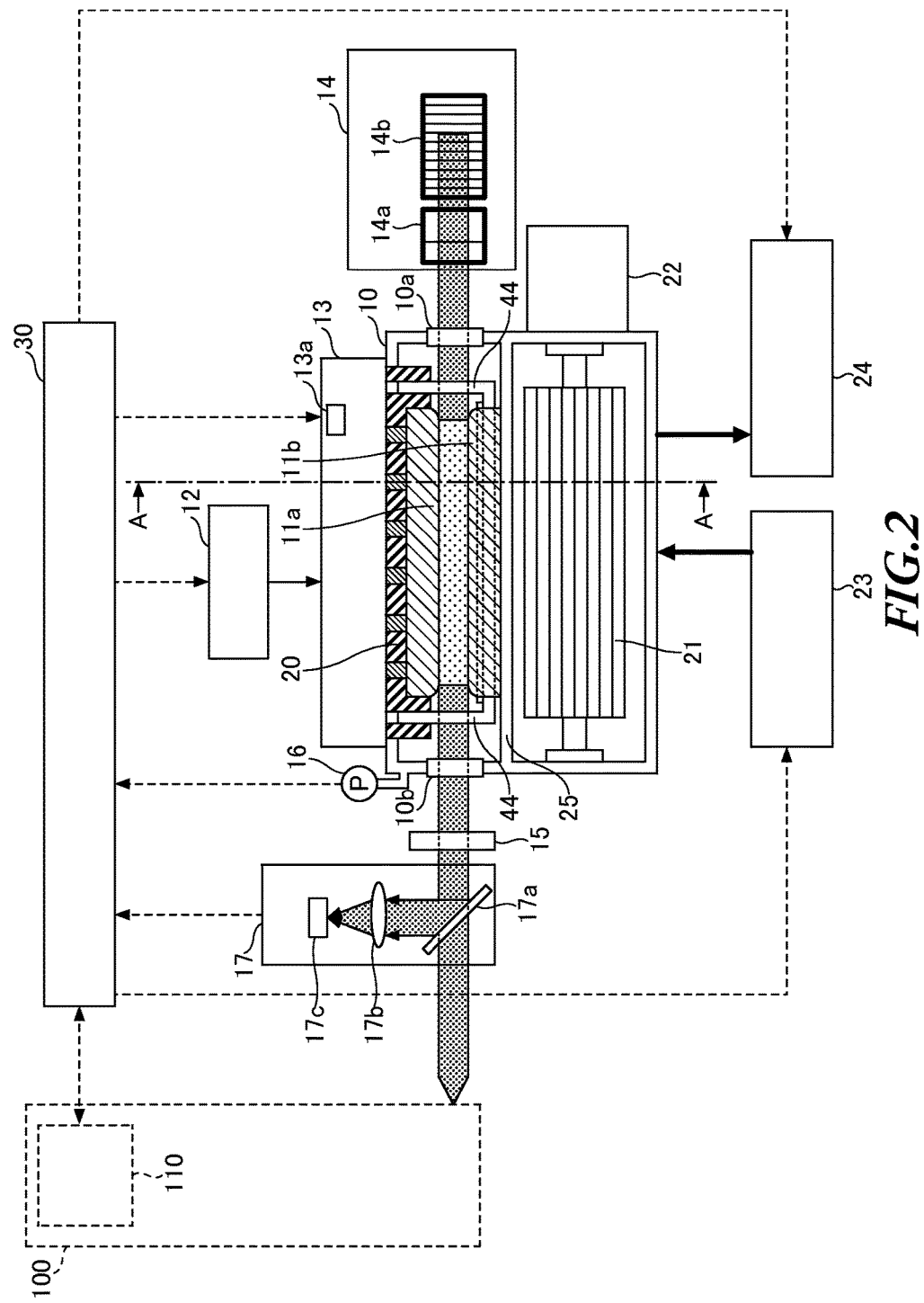
FIG. 2 is a schematic configuration diagram showing an exemplary laser apparatus according to an aspect of the present disclosure.
Figure 3:
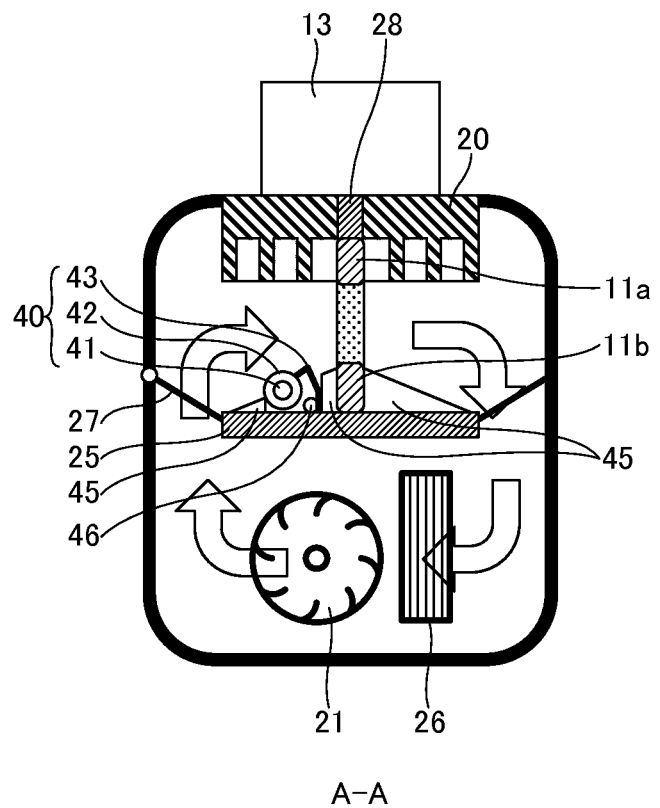
FIG. 3 is a cross-sectional view showing a laser chamber 10 shown in FIG. 2.

FIGS. 2 and 3 show an excimer laser apparatus according to an aspect of the present disclosure. The excimer laser apparatus may simply be referred to as "laser apparatus" herein. FIG. 2 is a cross-sectional view showing the laser apparatus taken along a plane parallel to the optical path of a pulsed laser beam, as a schematic configuration diagram of the laser apparatus. FIG. 3 is a cross-sectional view showing a laser chamber of the laser apparatus, which is taken along plane A-A perpendicular to the optical path of the pulsed laser beam.

The laser apparatus according to the present disclosure may include a controller 30, the laser chamber 10, a laser resonator, a pulse energy measurement unit 17, a charger 12, a pulse power module (PPM) 13, a laser gas supply part 23, and a laser gas discharge part 24.

The laser chamber 10 may include a pair of discharge electrodes 11a and 11b, an electric insulator 20, a preliminary ionization discharge part 40, a crossflow fan 21, a heat exchanger 26, a motor 22, two windows 10a and 10b configured to allow the light in the laser resonator to pass therethrough, and a pressure sensor 16. One of the pair of discharge electrodes 11a and 11b may be referred to as a first discharge electrode 11a, and the other may be referred to as a second discharge electrode 11b herein.

The laser chamber 10 may be provided on the optical path of the laser resonator. The laser resonator may include an output coupler (OC) mirror 15, and a line narrowing module (LNM) 14. The LNM 14 may include a prism 14a that expands a laser beam, and a grating 14b. The grating 14b may be provided in a Littrow configuration so that the incident angle is the same as the diffraction angle.

The OC mirror 15 may be a partial reflection mirror configured to reflect part of the pulsed laser beam and to allow the other part of the pulsed laser beam to transmit therethrough. The pulse energy measurement unit 17 may include a beam splitter 17a, a collector lens 17b and an optical sensor 17c. The beam splitter 17a may be provided on the optical path of the pulsed laser beam having transmitted through and exited the OC mirror 15. The collector lens 17b and the optical sensor 17c may be provided on the optical path of the pulsed laser beam having been reflected from the beam splitter 17a.

The PPM 13 may include a charging capacitor (not shown) and be connected to the first discharge electrode 11a via a feedthrough 28. The PPM 13 may include a switch 13a used to generate an electric discharge between the first discharge electrode 11a and the second discharge electrode 11b. The charger 12 may be connected to the charging capacitor (not shown) in the PPM 13.

The laser chamber 10 may contain laser gas. The laser gas may include Ar or Kr as rare gas, $F_2$ gas as halogen gas, or Ne or He as buffer gas, or mixed gas thereof. The laser gas supply part 23 may include a valve (not shown) and a flow control valve (not shown). The laser gas supply part 23 may be connected to a gas bomb (not shown) containing the laser gas. The laser gas discharge part 24 may include a valve and an exhaust pump (not shown).

The preliminary ionization discharge part 40 may include a preliminary ionization inner electrode 41, the dielectric pipe 42, and the preliminary ionization outer electrode 43.

Figure 4:
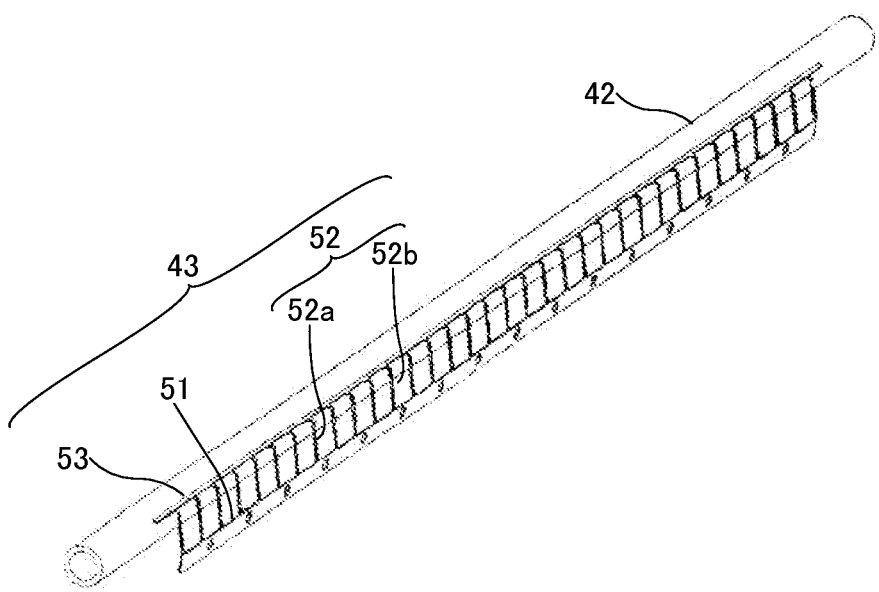
FIG. 4 is a perspective view showing the preliminary ionization electrode part.

As shown in FIG. 4, the preliminary ionization outer electrode 43 may include a fixed plate part 51, a ladder part 52, and the contact plate part 53. The ladder part 52 may connect between the fixed plate part 51 and the contact plate part 53, and include a plurality of elongate connecting portions 52a formed at a predetermined interval. In the ladder part 52, an opening 52b may be formed each between the adjacent connecting portions 52a. The preliminary ionization outer electrode 43 may be made of a metallic material primarily containing copper, for example, oxygen free copper, phosphor bronze, and brass. The dielectric pipe 42 may be made of a dielectric material such as $Al_2O_3$.

Here, the connecting portions 52a may have elasticity, and be formed to exert a force in the direction in which the contact plate part 53 pushes the dielectric pipe 42 by the resilience of the elastic connecting portions 52a. The ladder part 52 including the connecting portions 52a may be referred to as "elastic part" or "first elastic part" herein.

The dielectric pipe 42 may be placed in the vicinity of the second discharge electrode 11b via a fixed pipe 44. The dielectric pipe 42 may be formed in a cylindrical shape, and the preliminary ionization inner electrode 41 having a cylindrical rod structure may be inserted into the cylindrical dielectric pipe 42. The preliminary ionization inner electrode 41 may be connected to the high-voltage side of the PPM 13 via the feedthrough 28 and a wire provided in the fixed pipe 44. The fixed pipe 44 and the wire provided in the fixed pipe 44 may be each connected to the two ends of preliminary ionization inner electrode 41.

As shown in FIG. 4, the preliminary ionization outer electrode 43 may be provided such that a predetermined force is applied from the front end of the contact plate part 53 to the dielectric pipe 42 side.

As shown in FIG. 3, the second discharge electrode 11b and the preliminary ionization discharge part 40 may be provided on an electrode holder 25. A wire 27 for supply of electric power may be connected to the second discharge electrode 11b and the preliminary ionization discharge part 40. A guide part 45 may be provided on the electric holder 25. The guide part 25 may be configured to hold the second discharge electrode 11b and the preliminary ionization discharge part 40, and be made of an insulating material. The preliminary ionization outer electrode 43 may be fixed to the guide part 45 with a bolt 46. The preliminary ionization outer electrode 43 may be connected to ground.

2.3 Operation

The controller 30 may receive a target pulse energy Et and an oscillation trigger from an exposure apparatus controller 110 of the exposure apparatus 100. By the control of the controller 30, the laser apparatus may set a predetermined charging voltage Vhv in the charger 12 to make the pulsed laser beam have the target pulse energy Et. Then, the switch 13a in the PPM 13 may be activated in synchronization with the oscillation trigger. By the activation of the switch 13a, it is possible to apply a high voltage to between the preliminary ionization inner electrode 41 and the preliminary ionization outer electrode 43 of the preliminary ionization discharge part 40, and also between the pair of discharge electrodes 11a and 11b.

By this means, first, a corona discharge may be generated in the preliminary ionization discharge part 40, and therefore UV light may be generated. When the laser gas between the pair of discharge electrodes 11a and 11b for a main discharge is irradiated with the generated UV light, the laser gas between the pair of discharge electrodes 11a and 11b can be preliminarily ionized. After that, an electric discharge is generated between the pair of discharge electrodes 11a and 11b, so that the laser gas may be excited. The light emitted from the excited laser gas may reciprocate in the laser resonator formed by the OC mirror 15 and the LNM 14, so that laser oscillation may be achieved. The spectral width of the light reciprocating in the laser resonator is narrowed by the prism 14a and the grating 14b, and part of the laser beam may exit the OC mirror 15.

Part of the pulsed laser beam having exited the OC mirror 15 may enter the pulse energy measurement unit 17. The part of the pulsed laser beam having entered the pulse energy measurement unit 17 may be reflected by the beam splitter 17a, and enter the optical sensor 17c via the collector lens 17b. Then, the optical sensor 17c may measure the pulse energy of the pulsed laser beam having entered the optical sensor 17c. Meanwhile, the other part of the pulsed laser beam having entered the pulse energy measurement unit 17 and transmitted through the beam splitter 17a may enter the exposure apparatus 100. In this way, the pulse energy measurement unit 17 may measure a pulse energy E of the pulsed laser beam having exited the OC mirror 15.

The controller 30 may store the charging voltage Vhv for generating the pulsed laser beam and the pulse energy E of the pulsed laser beam having exited the OC mirror 15. The controller 30 may perform a feedback control to regulate the charging voltage Vhv to make the pulsed laser beam have the target pulse energy Et, based on a difference ΔE between the target pulse energy Et and the actually outputted pulse energy E. In this way, the charging voltage Vhv may be changed by the control of the controller 30.

When the charging voltage Vhv becomes higher than the allowable maximum value, the controller 30 may control the laser gas supply part 23 to supply the laser gas into the laser chamber until the pressure in the laser chamber 10 reaches a predetermined value. Meanwhile, when the charging voltage Vhv becomes lower than the allowable minimum value, the controller 30 may control the laser gas discharge part 24 to discharge the laser gas from the laser chamber 10 until the pressure in the laser chamber 10 reaches the predetermined value.

2.4 Others

The laser apparatus may not necessarily be a line narrowing laser apparatus, but may be a laser apparatus that outputs spontaneously oscillating light. For example, a high-reflection mirror may be provided instead of the LNM 14. Moreover, the excimer laser apparatus has been described as an example, but an $F_2$ molecular laser apparatus may be applicable, which uses gas containing fluorine gas and buffer gas as the laser gas.

3. Preliminary Ionization Discharge Part

Studies were conducted to find the reason why the contact plate part 53 of the preliminary ionization outer electrode 43 is unevenly ground, and therefore great gaps are created between the dielectric pipe 42 and the contact plate part 53 of the preliminary ionization outer electrode 43 in the preliminary ionization discharge part 40, as shown in FIG. 1B.

The outer surface of the dielectric pipe 42 sometimes includes irregularities or the like of about 0.35 mm. Therefore, when the rigidity of the contact plate part 53 of the preliminary ionization outer electrode 43 is high but a force to push the contact plate part 53 against the surface of the dielectric pipe 42 is low, some gaps may be randomly created between the contact plate part 53 and the dielectric pipe 42.

These gaps may cause electrons generated by the corona discharge to collide with the contact plate part 53 of the preliminary ionization outer electrode 43, so that the material of the contact plate part 53 may be damaged by the electron collision. Therefore, when the corona discharges are repeatedly generated, each of the gaps between the contact plate part 53 and the dielectric pipe 42 gradually widens, and consequently, for example, the size of the gap may become 1.5 mm. In this way, the large gaps created between the contact plate part 53 and the dielectric pipe 42 exert an adverse impact on the main discharge as described above.

Therefore, there is a demand for providing the preliminary ionization outer electrode 43 having appropriate flexibility and pushing force. In order to increase the flexibility of the preliminary ionization outer electrode 43, it is conceivable that the openings 52b of the ladder part 52 are widened to reduce the number of connecting portions 52a, or that the width of each of the connecting portions 52a is reduced. In these cases, however, the pushing force may be reduced.

Meanwhile, in order to increase the pushing force, it is conceivable that the openings 52a of the ladder part 52 are narrowed to increase the number of the connecting portions 52a, or that the width of each of the connecting portions 52a is widened. In these cases, however, the flexibility is lost.

As described above, the flexibility and the pushing force of the preliminary ionization outer electrode 43 are placed in a tradeoff relationship, and therefore it is difficult to satisfy both requirements.

3.1 Embodiment 1

Figure 5A:
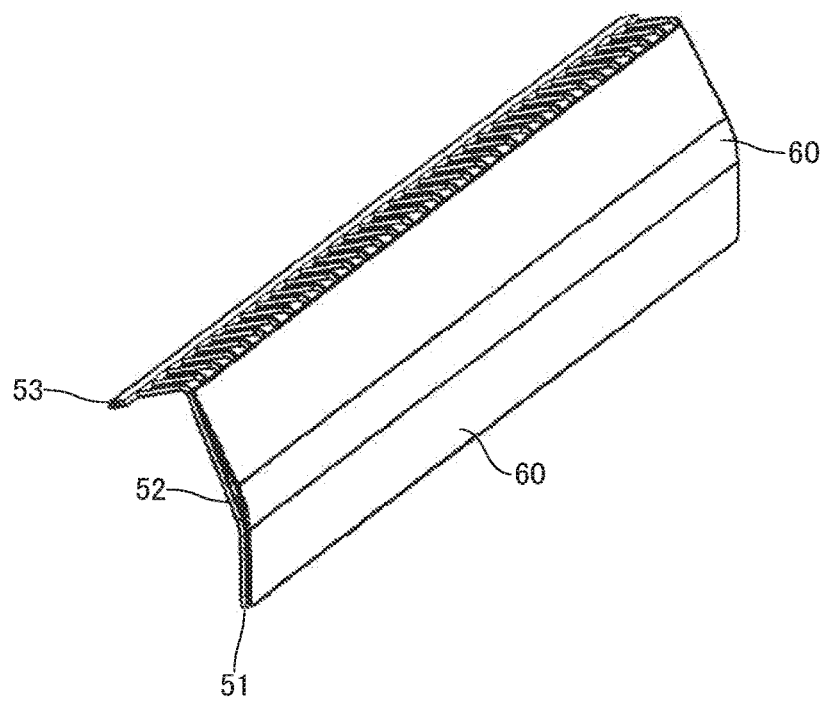
FIG. 5A is an explanatory drawing showing the preliminary ionization electrode part according to Embodiment 1 of the present disclosure.
Figure 5B:
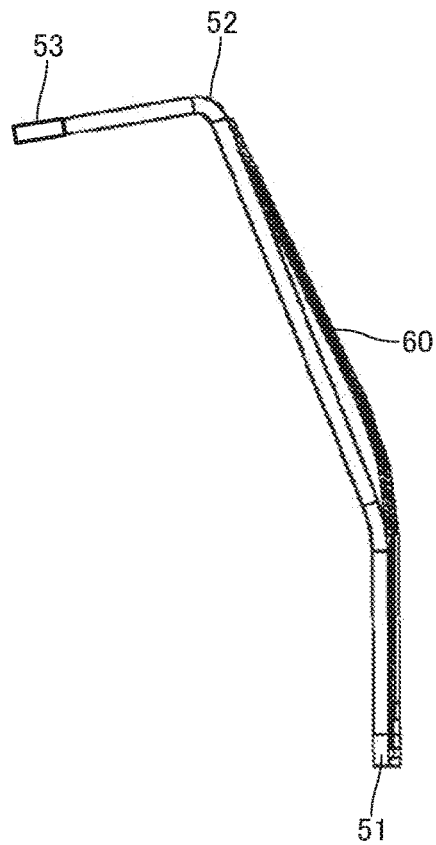
FIG. 5B is an explanatory drawing showing the preliminary ionization electrode part according to Embodiment 1 of the present disclosure.

Now, Embodiment 1 will be described with reference to FIG. 5. Here, FIG. 5A is a perspective view showing the preliminary ionization outer electrode 43 according to the present embodiment. FIG. 5B is a side view showing the preliminary ionization outer electrode 43 according to the present embodiment. With the present embodiment, the preliminary ionization discharge part 40 has a structure in which a flat spring part 60 is provided in the preliminary ionization outer electrode 43, and the pushing force of the contact plate part 53 applied to the dielectric pipe 42 is increased by an additional elastic force of this flat spring part 60. The flat spring part 60 may be formed by laminating a plurality of flat springs made of, for example, brass. The lower end of the flat spring part 60 may be fixed to the guide part 45 together with a fixed plate part 51 by the bolt 46. With the present embodiment, the contact plate part 53 of the preliminary ionization outer electrode 43 can be pushed against the dielectric pipe 42 by the elastic force of the flat spring part 60, which is equal to or greater than the predetermined pushing force. Brass is preferable as the material of the flat spring part 60, but nickel-plated stainless may be applicable. By this means, even if the outer surface of the dielectric pipe 42 includes irregularities or unevenness, the entire area of the contact plate part 53 in the longitudinal direction can be pushed against the dielectric pipe 42 with the pushing force equal to or greater than the predetermined value. Therefore, it is possible to prevent gaps from being created between the dielectric pipe 42 and the preliminary ionization outer electrode 43. The flat spring part 60 may be referred to as "additional elastic part" herein.

3.2 Embodiment 2

Figure 6A:
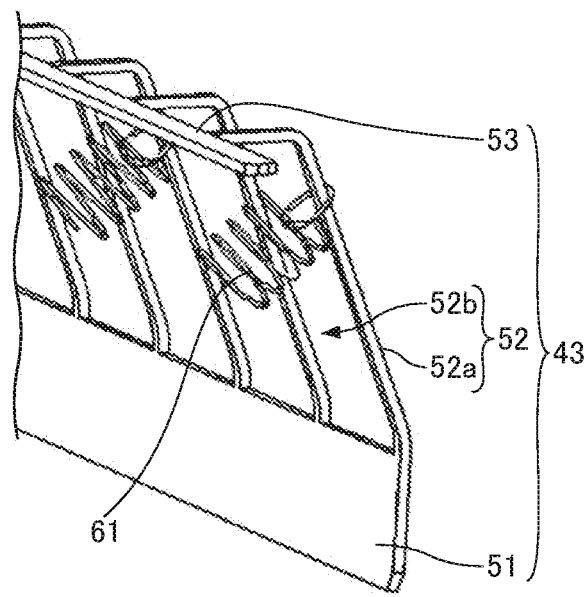
FIG. 6A is an explanatory drawing showing the preliminary ionization electrode part according to Embodiment 2 of the present disclosure.
Figure 6B:
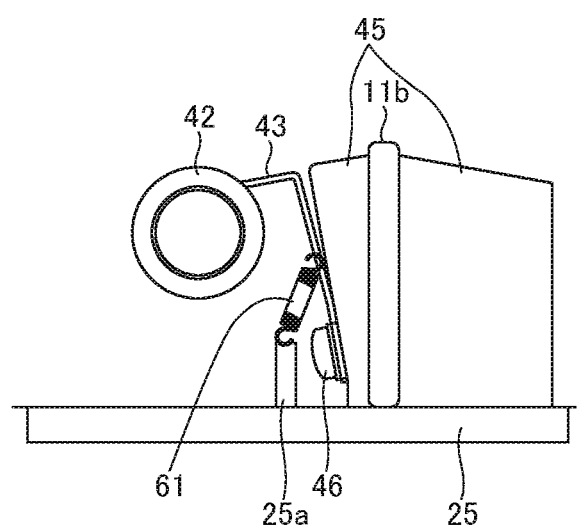
FIG. 6B is an explanatory drawing showing the preliminary ionization electrode part according to Embodiment 2 of the present disclosure.

Next, Embodiment 2 will be described. With the present embodiment, coil springs may be provided instead of the flat spring, as shown in FIGS. 6A and 6B. Here, FIG. 6A is a perspective view showing the preliminary ionization outer electrode 43 according to the present embodiment. FIG. 6B is a side view showing the preliminary ionization outer electrode 43 according to the present embodiment. With the present embodiment, the preliminary ionization outer electrode 43 may include coil springs 61 as extension springs. One ends of the coil springs 61 may be connected to the connecting portions 52a of the ladder part 52 of the preliminary ionization outer electrode 43, and the other ends may be connected to the end of a protrusion portion 25a provided on the electrode holder 25. The coil springs 61 provided as described above are configured to exert a force in the direction in which the coil springs 61 contract, and therefore can increase the pushing force of the contact plate part 53 applied to the dielectric pipe 42. Here, the material of the coil springs 61 may be nickel-plated stainless. The coil springs 61 may be provided on all the connecting portions 52a of the ladder part 52.

Figure 7A:
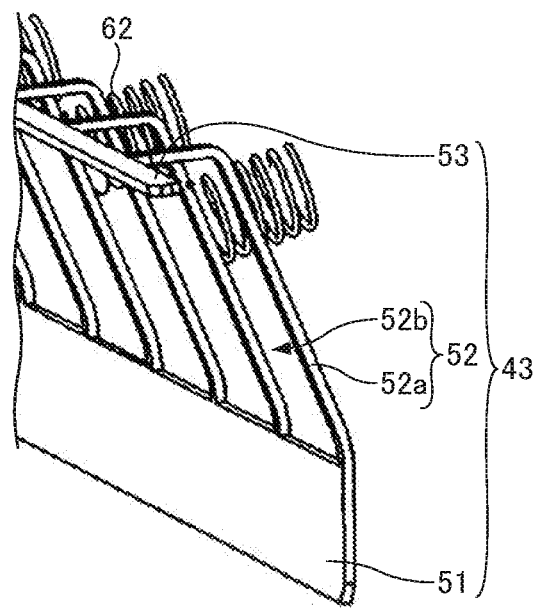
FIG. 7A is an explanatory drawing showing another preliminary ionization electrode part according to Embodiment 2 of the present disclosure.
Figure 7B:
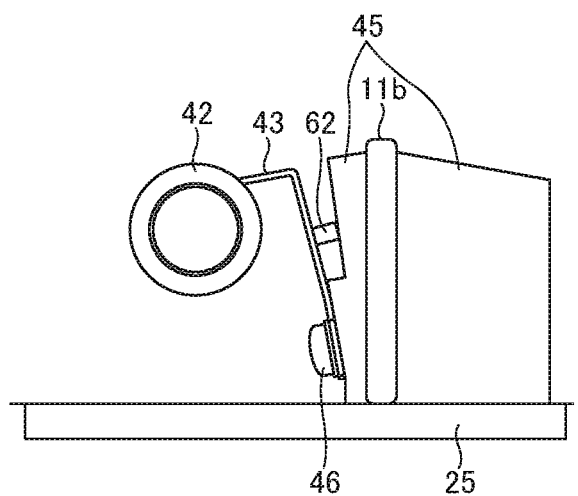
FIG. 7B is an explanatory drawing showing the other preliminary ionization electrode part according to Embodiment 2 of the present disclosure.

Moreover, with the present embodiment, coil springs 62 as compression springs may be used, as shown in FIGS. 7A and 7B. Here, FIG. 7A is a perspective view showing the preliminary ionization outer electrode 43 according to the present embodiment. FIG. 7B is a side view showing the preliminary ionization outer electrode 43 according to the present embodiment. With the present embodiment, the preliminary ionization outer electrode 43 may include the coil springs 62 as compression springs. One ends of the coil springs 62 may be connected to the connecting portions 52a of the ladder part 52 of the preliminary ionization outer spring 43, and the other ends may be connected to part of the guide part 45. The coil springs 62 provided as described above exert a force in the direction in which the coil springs 62 expand. By this means, it is possible to increase the pushing force of the contact plate part 53 applied to the dielectric pipe 42. Here, the material of the coil springs 62 may be nickel-plated stainless. The coil springs 62 may be connected to all the connecting portions 52a of the ladder part 52.

As described above, with the present embodiment, even if the outer surface of the dielectric pipe 42 includes irregularities or unevenness, it is possible to apply a pushing force equal to or greater than the predetermined value. Therefore, it is possible to prevent gaps from being created between the dielectric pipe 42 and the preliminary ionization outer electrode 43. The coil springs 61 or the coil springs 62 may be referred to as "additional elastic part" herein.

3.3 Embodiment 3

Figure 8A:
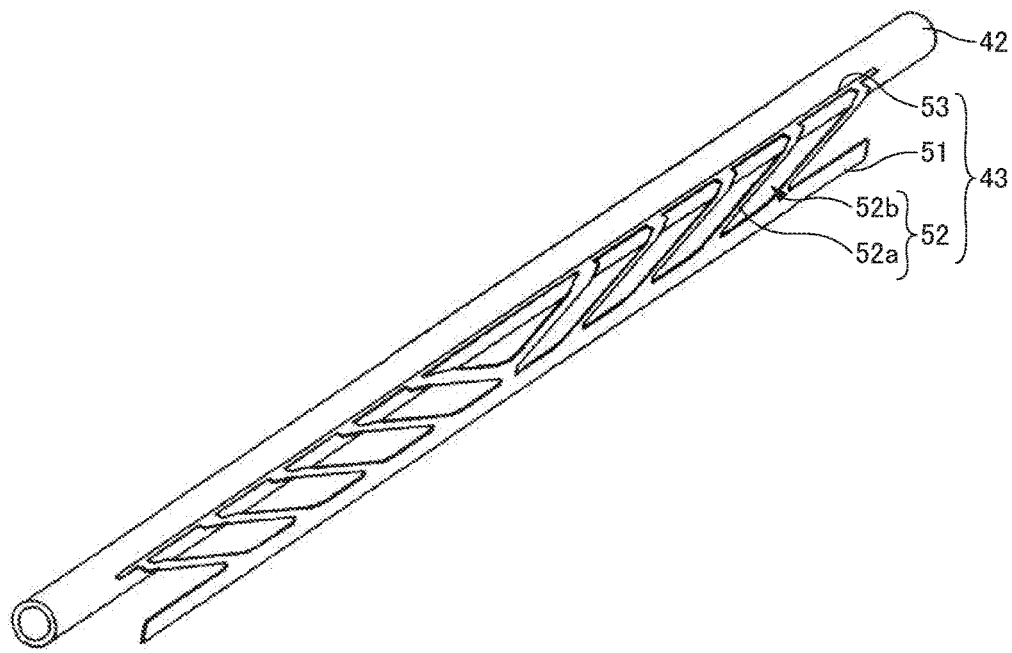
FIG. 8A is an explanatory drawing showing the preliminary ionization electrode part according to Embodiment 3 of the present disclosure.
Figure 8B:
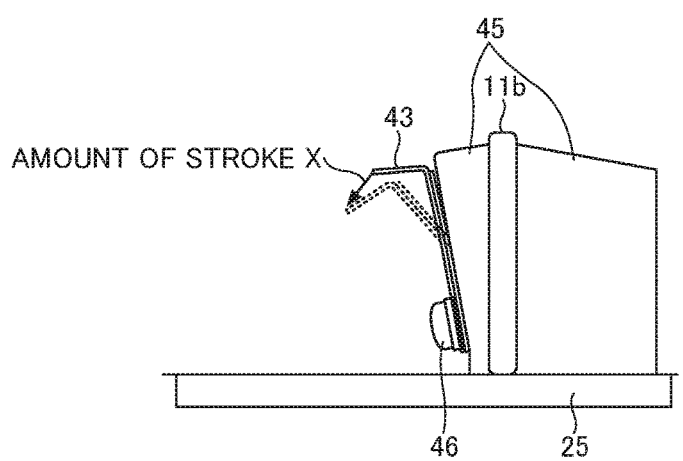
FIG. 8B is an explanatory drawing showing the preliminary ionization electrode part according to Embodiment 3 of the present disclosure.

Next, Embodiment 3 will be described. With the present embodiment, the preliminary ionization outer electrode 43 may have a structure in which each of the openings 52b of the ladder part 52 is formed in a diamond shape or triangular shape, and the length of each of the connecting portions 52a may be increased, as shown in FIGS. 8A and 8B. In other words, the longitudinal directions of the connecting portions 52a may be inclined to the longitudinal direction of the contact plate part 53 and the fixed plate part 51, at angles other than 90 degrees. Here, FIG. 8A is a perspective view showing the preliminary ionization outer electrode 43 according to the present embodiment. FIG. 8B is a side view showing the preliminary ionization outer electrode 43 according to the present embodiment. With the present embodiment, it is possible to increase an amount of stroke X within the range of elastic deformation in the preliminary ionization outer electrode 43, without increasing the whole size of the preliminary ionization outer electrode 43. That is, in order to increase the amount of stroke X, it is required to increase the lengths of the connecting portions 52a in general. In this case, however, the preliminary ionization outer electrode 43 increases in size. With the present embodiment, therefore, the connecting portions 52a are formed to be inclined, so that it is possible to increase the amount of stroke X without increasing the preliminary ionization outer electrode 43 in size. For example, when the angle between the longitudinal direction of the contact plate part 53 and the fixed plate part 51 and the longitudinal direction of the connecting portions 52a is 30 degrees, it is possible to increase the length of the connecting portion 52a about twice, and therefore to increase the amount of stroke X accordingly. Moreover, with the present embodiment, the number of components is not increased.

With the present embodiment, even if the outer surface of the dielectric pipe 42 includes irregularities or unevenness, it is possible to improve the adaptability for the surface profile such as irregularities by increasing the amount of stroke X. Consequently, it is possible to prevent gaps from being created between the dielectric pipe 42 and the preliminary ionization outer electrode 43.

3.4 Embodiment 4

Figure 9A:
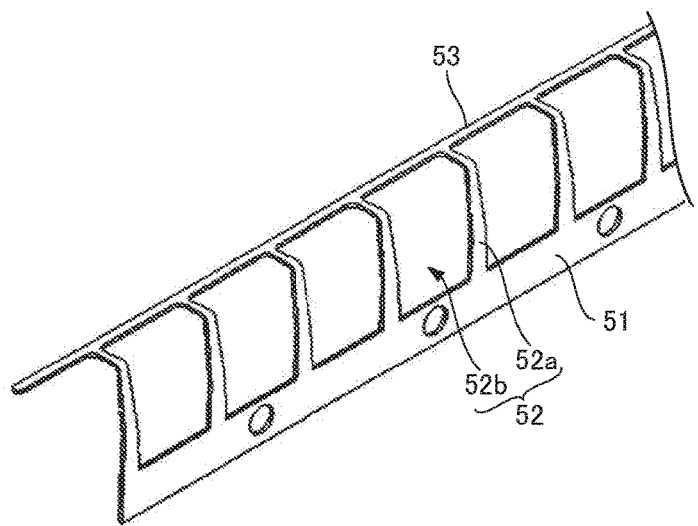
FIG. 9A is an explanatory drawing showing the preliminary ionization electrode part according to Embodiment 4 of the present disclosure.
Figure 9B:
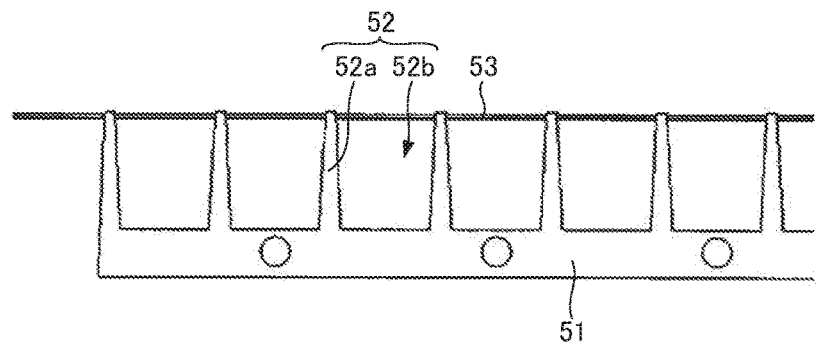
FIG. 9B is an explanatory drawing showing the preliminary ionization electrode part according to Embodiment 4 of the present disclosure.

Next, Embodiment 4 will be described. With the present embodiment, in order to increase the pushing force, the preliminary ionization outer electrode 43 may be formed such that the cross section of each of the connecting portions 52a orthogonal to its longitudinal direction is gradually increased from the contact plate part 53 side to the fixed plate part 51 side as shown in FIGS. 9A and 9B. Here, FIG. 9A is a perspective view showing the preliminary ionization outer electrode 43. FIG. 9B is a side view showing the preliminary ionization outer electrode 43. With the present embodiment, the cross section of each of the connecting portions 52a is gradually increased from the contact plate part 53 side to the fixed plate part 51 side, so that it is possible to increase the pushing force. That is, it is possible to increase the pushing force by partially increasing the cross section of each of the connecting portions 52a, while retaining the flexibility by partially keeping the circumference of each of the connecting portions 52 as before. With the present embodiment, the width of each of the connecting portions 52a may increase from 1.0 mm in the contact plate part 53 side to 3.0 mm in the fixed plate part 51 side.

3.5 Embodiment 5

Figure 10A:
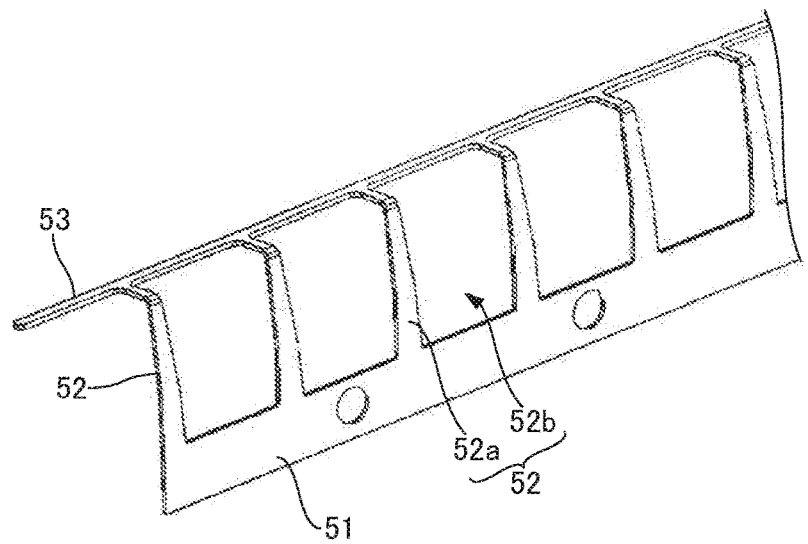
FIG. 10A is an explanatory drawing showing the preliminary ionization electrode part according to Embodiment 5 of the present disclosure.
Figure 10B:
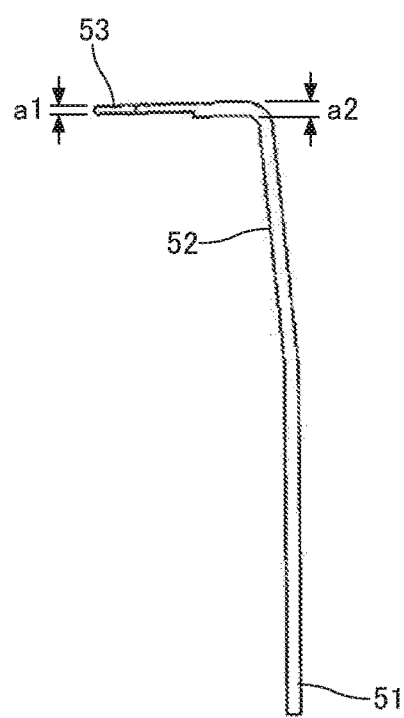
FIG. 10B is an explanatory drawing showing the preliminary ionization electrode part according to Embodiment 5 of the present disclosure.

Next, Embodiment 5 will be described. With the present embodiment, in order to increase both the flexibility and the pushing force, the preliminary ionization outer electrode 43 may have a structure in which the thickness of the contact plate part 53 is smaller than the thickness of each of the connecting portions 52a of the ladder part 52 and the fixed plate part 51 as shown in FIGS. 10A and 10B, in addition to the structure according to Embodiment 4. Here, FIG. 10A is a perspective view showing the preliminary ionization outer electrode 43 according to the present embodiment. FIG. 10B is a side view showing the preliminary ionization outer electrode 43 according to the present embodiment. With the present embodiment, the thickness of the contact plate part 53 formed in a plate shape is smaller than the thickness of each of the connecting portions 52a of the ladder part 52 and the fixed plate part 51. By this means, it is possible to increase both the flexibility and the pushing force. That is, it is possible to increase the flexibility by reducing the thickness of the contact plate part 53, while increasing the pushing force by partially increasing the cross section of each of the connecting portions 52a of the ladder part 52. With the present embodiment, a thickness a1 of the contact plate part 53 may be about 0.3 mm, and a thickness a2 of each of the connecting portions 52a of the ladder part 52 and the fixed plate part 51 may be 0.5 mm.

3.6 Embodiment 6

Next, Embodiment 6 will be described. With the present embodiment, as shown in FIG. 11, a protection film 150 made of, for example, a dielectric material may be formed on the front end of the contact plate part 53 of the preliminary ionization outer electrode 43. The protection film 150 may be formed at least on a region in which a corona discharge is generated, in the front end of the contact plate part 53. FIG. 11A is a perspective view showing the preliminary ionization outer electrode 43 according to the present embodiment. FIG. 11B is a side view showing the preliminary ionization outer electrode 43 according to the present embodiment.

For the preliminary ionization outer electrode 43 used in a discharge excited gas laser apparatus containing fluorine gas as laser gas, fluoride is preferred as the material of the dielectric film formed on the contact plate part 53 of the preliminary ionization outer electrode 43.

For example, when the preliminary ionization outer electrode 43 is made of copper or a material primarily containing copper, a film of copper fluoride ($CuF_2$) is formed uniformly in the longitudinal direction under the condition that the pushing force of the contact plate part 53 is equal to or greater than 1.8 kgf and corona discharges are generated about $1 \times 10^9$ times. In this way, by forming the film of $CuF_2$ uniformly in the longitudinal direction, the contact plate part 53 is hardly ground even if the corona discharges are generated. The thickness of the protection film 150 formed on the contact plate 53 is preferably equal to or more than 0.005 mm and equal to or less than 1.5 mm, more preferably, equal to or more than 0.1 mm and equal to or less than 1.0 mm. With the present embodiment, it is possible to reduce an amount of abrasion of the preliminary ionization outer electrode 43.

Examples of the material of the protection film 150 may include fluoride, such as $CuF_2$, $CaF_2$, $SrF_2$, $MgF_2$, $AlF_3$, $NiF_3$, $CoF_3$, and $FeF_3$. Among them, $CaF_2$ and $SrF_2$ having a low vapor pressure are more preferable.

The protection film 150 may be uniformly and densely formed by a single material made of fluoride. For example, the protection film 150 may be made of $CuF_2$, and have a thickness of about 0.1 mm. In addition, for example, $Al_2O_3$ or AlN resistant to fluorine may be used as the material of the protection film 150. The protection film 150 may be formed by, for example, thermal spraying, detonation flame spraying, PVD (physical vapor deposition), CVD (chemical vapor deposition), and plasma deposition.

Figure 12:
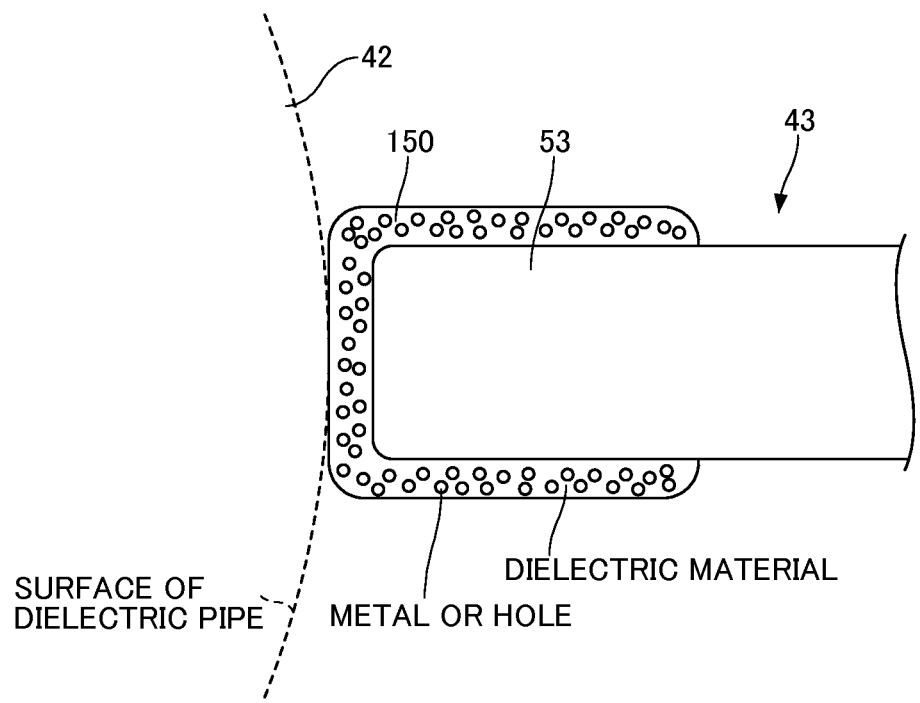
FIG. 12 is an explanatory drawing showing a protection film formed on the preliminary ionization electrode part according to Embodiment 6 of the present disclosure.

Moreover, as shown in FIG. 12, the protection film 150 may be made of a composite material obtained by mixing fine particles of high electroconductive metal into a dielectric film made of, for example, $Al_2O_3$, in order to ensure the conductivity. In this case, the metal used for the protection film 150 may be the same as or different from the metal forming the preliminary ionization outer electrode 43. To be more specific, the metal may include, for example, Cu, Al, Co, Ni, Sr, and Fe. This protection film 150 may be formed by the thermal spraying of metal particles primarily containing, for example, Cu, and a dielectric material primarily containing, for example, $Al_2O_3$ on the contact plate part 53 of the preliminary ionization outer electrode 43. In this case, the protection film 150 may be formed by doping $Al_2O_3$ with fine particles of Cu to have a thickness of about 0.1 mm.

Moreover, when the laser gas contains fluorine, the metal may include, for example, Al, Ca, Sr, Mg, Cu, Ni, Co, and Fe. It is because a strong fluorinated film can be formed by fluorinating these metal materials. It is preferred that the ratio of the material with which the dielectric material is doped is 0.01% to 50% with respect to the dielectric material.

Moreover, the protection film 150 may include holes unevenly dispersed therein, each having a diameter of about 0.1 mm. The holes may not penetrate through the protection film 150. It is because the thin parts of the protection film 150 in which the holes are formed are sequentially broken down, so that the protection film 150 can be conductive.

Figure 13:
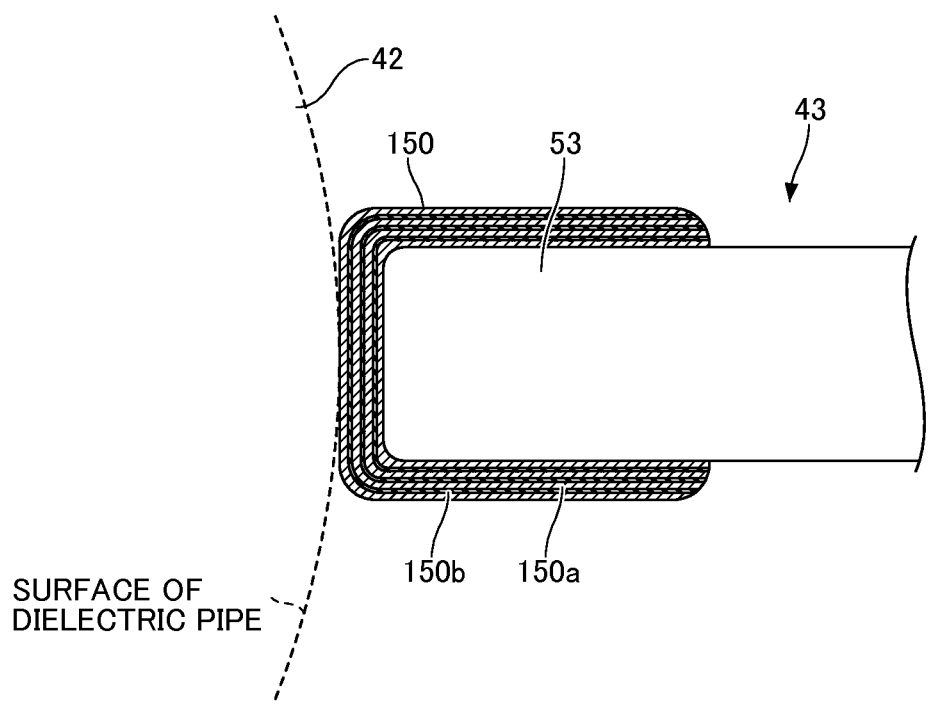
FIG. 13 is another explanatory drawing showing a protection film formed on the preliminary ionization electrode part according to Embodiment 6 of the present disclosure.

Moreover, as shown in FIG. 13, the protection film 150 may be a multilayer film formed by alternately laminating dielectric films 150a made of, for example, $Al_2O_3$, and metal films 150b made of, for example, Cu.

With the present embodiment, it is possible to reduce an amount of abrasion of the preliminary ionization outer electrode 43 and to equalize the preliminary ionization discharges for a long period of time. Consequently, it is possible to equalize the main electric discharges for a long period of time. As a result, it is possible to reduce the amount of the abrasion of the discharge electrodes 11a and 11b.

4. Charge And Discharge Circuit

Figure 14:
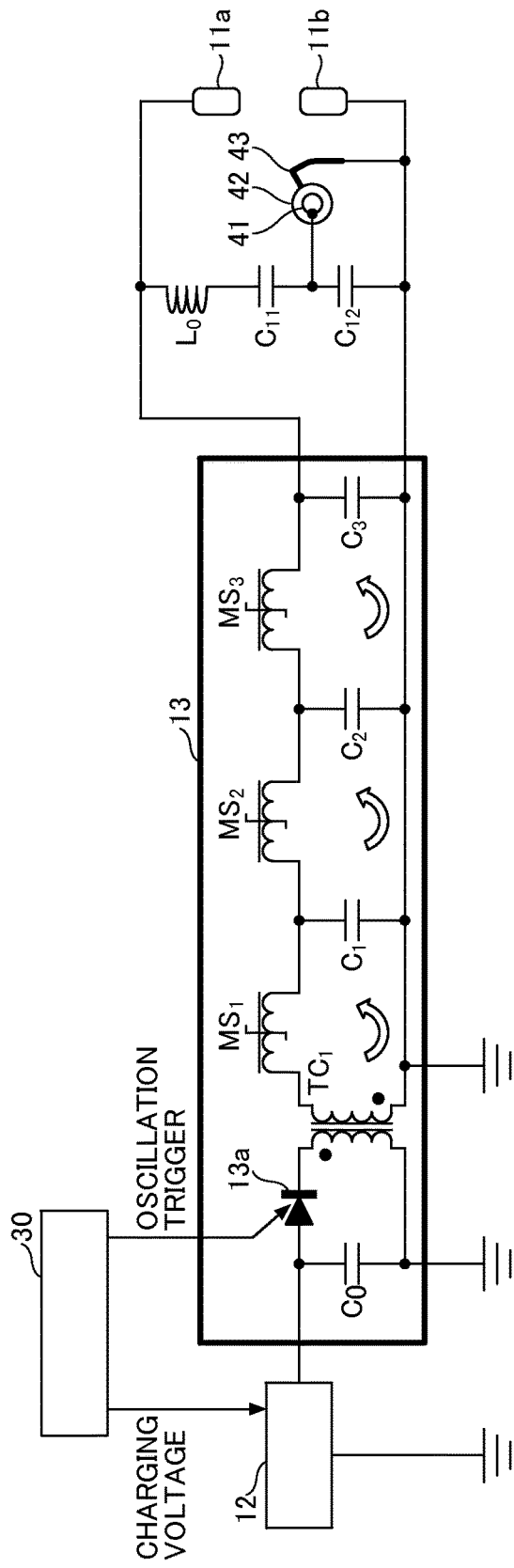
FIG. 14 is an explanatory drawing showing a charge and discharge circuit used in the exemplary laser apparatus according to an aspect of the present disclosure.

Next, with reference to FIG. 14, the configuration of a charge and discharge circuit including the PPM 13 will be described.

The PPM 13 may include a semiconductor switch as the above-described switch 13a, a transformer $TC_1$, magnetic switches $MS_1$, $MS_2$ and $MS_3$, a charging capacitor $C_0$, and capacitors $C_1$, $C_2$ and $C_3$. Here, when the value of the time integration of the voltage applied to a magnetic switch reaches a threshold value, a current easily flows through the magnetic switch. The state in which a current easily flows through the magnetic switch may be described as "the magnetic switch is closed" herein. The threshold value is unique to each of the magnetic switches.

The switch 13a may be provided between the charging capacitor $C_0$ and the primary side of the transformer $TC_1$. The magnetic switch $MS_1$ may be provided between the secondary side of the transformer $TC_1$ and the capacitor $C_1$. The magnetic switch $MS_2$ may be provided between the capacitor $C_1$ and the capacitor $C_2$. The magnetic switch $MS_3$ may be provided between the capacitor $C_2$ and the capacitor $C_3$.

The primary side and the secondary side of the transformer $TC_1$ may be electrically insulated from one another. In addition, the direction of the winding of the primary side of the transformer $TC_1$ may be opposite to that of the secondary side.

The laser chamber 10 and the electrode 11b may be electrically connected to one another and be both connected to ground.

Moreover, a voltage-dividing circuit may be provided. The voltage-dividing circuit may include capacitors $C_{11}$ and $C_{12}$, and an inductance $L_0$, which is connected to the pair of electrodes 11a and 11b in parallel. In the voltage-dividing circuit, the capacitors $C_{11}$ and $C_{12}$, and the inductance $L_0$ may be connected to each other in series.

Next, the operations of the charger 12 and the PPM 13 will be described.

By the control of the controller 30, the charging voltage Vhv may be set in the charger 12. In addition, the charger 12 may charge the charging capacitor $C_0$ based on the charging voltage Vhv set therein.

In the PPM 13, when the controller 30 sends a signal for laser oscillation to the switch 13a, the switch 13a may be closed, and the charging capacitor $C_0$ may flow a current to the primary side of the transformer $TC_1$.

When a current flows in the primary side of the transformer $TC_1$, a current in the opposite direction may flow in the secondary side of the transformer $TC_1$ due to electromagnetic induction.

After that, the magnetic switch $MS_1$ is closed by an electromotive force which is generated by flowing the current in the secondary side of the transformer $TC_1$, and the current flows from the secondary side of the transformer $TC_1$ to the capacitor $C_1$, so that the capacitor $C_1$ may be charged.

After the capacitor $C_1$ is charged, the magnetic switch $MS_2$ is closed, and therefore the current flows from the capacitor $C_1$ to the capacitor $C_2$, so that the capacitor $C_2$ may be charged. In this case, the capacitor $C_2$ may be charged with the pulse width of the current shorter than the pulse width of the current for charging the capacitor $C_1$.

After the capacitor $C_2$ is charged, the magnetic switch $MS_3$ is closed, and therefore the current flows from the capacitor $C_2$ to the capacitor $C_3$, so that the capacitor $C_3$ may be charged. In this case, the capacitor $C_3$ may be charged with the pulse width of the current shorter than the pulse width of the current for charging the capacitor $C_2$.

As described above, the current flows sequentially from the capacitor $C_1$ to capacitor $C_2$, and from the capacitor $C_2$ to the capacitor $C_3$, and therefore the pulse width is shortened, so that the capacitor $C_3$ may be charged.

After that, a voltage is applied from the capacitor $C_3$ to between the first electrode 11a and the second electrode 11b provided in the laser chamber 10, so that an electric discharge may be generated in the laser gas between the first electrode 11a and the second electrode 11b. In this case, a negative potential (−HV) may be applied to the first electrode 11a.

The voltage-dividing circuit including the capacitors $C_{11}$ and $C_{12}$, and the inductance $L_0$, which is arranged in parallel to the pair of electrodes 11a and 11b may divide the pulse voltage applied to between the pair of electrodes 11a and 11b. The range of the divided pulse voltage may be 25% to 75% of the pulse voltage applied to between the pair of electrodes 11a and 11b. The divided pulse voltage may be applied to the preliminary ionization inner electrode 41 and the preliminary ionization outer electrode 43 in the preliminary ionization discharge part 40.

The time constant may be made to be a desired value by adjusting the division ratio of the voltage-dividing circuit, the capacitance of each of the capacitors $C_{11}$ and $C_{12}$, and the value of the inductance $L_0$, and therefore the timing of a preliminary ionization discharge may be adjusted with respect to the main discharge. The combined capacitance of the capacitors in the voltage-dividing circuit may be equal to or lower than 10% of the capacitance of the capacitor $C_3$.

The above-described embodiments and the modifications thereof are merely examples for implementing the present disclosure, and the present disclosure is not limited thereto. Making various modifications according to the specifications or the like falls within the scope of the present disclosure, and it is apparent from the above description that other various embodiments are possible within the scope of the present disclosure.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the indefinite article "one (a/an)" should be interpreted as "at least one" or "one or more."

REFERENCE SIGNS LIST 10 laser chamber
10a window
10b window
11a discharge electrode (first discharge electrode)
11b discharge electrode (second discharge electrode)
12 charger
13 PPM (pulse power module)
13a switch
14 LNM (line narrowing module)
14a prism
14b grating
15 OC (output coupler) mirror
16 pressure sensor
17 pulse energy measurement unit
17a beam splitter
17b collector lens
17c optical sensor
20 electric insulator
21 crossflow fan
22 motor
23 laser gas supply part
24 laser gas discharge part
25 electrode holder
26 heat exchanger
27 wire
28 feedthrough
30 controller
40 preliminary ionization discharge part (preliminary ionization discharge apparatus)
41 preliminary ionization inner electrode
42 dielectric pipe
43 preliminary ionization outer electrode
44 fixed pipe
45 guide part
46 bolt
51 fixed plate part
52 ladder part (elastic part, first elastic part)
52a connecting portion
52b opening
53 contact plate part
60 flat spring (additional elastic part)
61 coil spring (additional elastic part)
62 coil spring (additional elastic part)
100 exposure apparatus
110 exposure apparatus controller
150 protection film

The invention claimed is:

1. A preliminary ionization discharge device used in a laser chamber of a laser apparatus using preliminary ionization, comprising:
   a dielectric pipe;
   a preliminary ionization inner electrode provided inside the dielectric pipe; and
   a preliminary ionization outer electrode provided outside the dielectric pipe, the preliminary ionization outer electrode including:
      a contact plate part configured to contact the dielectric pipe;
      an elastic part configured to exert a force in a direction in which the contact plate part pushes the dielectric pipe, a first end of the elastic part being connected to the contact plate part;
      an additional elastic part configured to exert a force in the direction in which the contact plate part pushes the dielectric pipe; and
      a fixed plate part connected to a second end of the elastic part that is opposite to the first end,
      wherein the additional elastic part is fixed to the fixed plate part.

2. The preliminary ionization discharge device according to claim 1, wherein:
   the elastic part includes a plurality of connecting portions connected to the contact plate part; and
   the elastic part is formed by the plurality of connecting portions having elasticity.

3. The preliminary ionization discharge device according to claim 1, wherein:
   a protection film made of a material including a dielectric material is formed on a surface of the contact plate part.

4. The preliminary ionization discharge device according to claim 3, wherein the protection film is made of a material including a fluorinated material.

5. The preliminary ionization discharge device according to claim 3, wherein the protection film is formed by laminating a dielectric film and a metallic film alternately.

6. The preliminary ionization discharge device according to claim 1, wherein the additional elastic part includes a flat spring that is disposed on an opposite side from the dielectric pipe with respect to the elastic part.

7. The preliminary ionization discharge device according to claim 6, wherein:
   the elastic part is bent at a bending portion;
   one end of the additional elastic part is fixed to the bending portion and the other end of the additional elastic part is fixed to the fixed plate part; and
   the elastic part and the additional elastic part are stacked on each other.

8. The preliminary ionization discharge device according to claim 7, wherein:
the elastic part includes a plurality of connecting portions connected between the contact plate part and the fixed plate part; and
the plurality of connecting portions is bent at the bending portion.

9. The preliminary ionization discharge device according to claim 8, wherein the preliminary ionization outer electrode further includes a gap provided between the elastic part and the additional elastic part.

10. The preliminary ionization discharge device according to claim 1, wherein the additional elastic part is formed by laminating a plurality of flat springs.

11. The preliminary ionization discharge device according to claim 10, wherein the plurality of flat springs is made of brass.

12. A laser apparatus comprising:
a laser chamber configured to contain laser gas;
a pair of discharge electrodes provided in the laser chamber; and
a preliminary ionization discharge device including:
a dielectric pipe;
a preliminary ionization inner electrode provided inside the dielectric pipe; and
a preliminary ionization outer electrode provided outside the dielectric pipe, the preliminary ionization outer electrode including:
a contact plate part configured to contact the dielectric pipe;
an elastic part configured to exert a force in a direction in which the contact plate part pushes the dielectric pipe, a first end of the elastic part being connected to the contact plate part;
an additional elastic part configured to exert a force in the direction in which the contact plate part pushes the dielectric pipe; and
a fixed plate part connected to a second end of the elastic part that is opposite to the first end,
wherein the additional elastic part is fixed to the fixed plate part.

13. The laser apparatus according to claim 12, wherein the additional elastic part includes a flat spring that is disposed on an opposite side from the dielectric pipe with respect to the elastic part.

14. The laser apparatus according to claim 13, wherein:
the elastic part is bent at a bending portion;
one end of the additional elastic part is fixed to the bending portion and the other end of the additional elastic part is fixed to the fixed plate part; and
the elastic part and the additional elastic part are stacked on each other.

15. The laser apparatus according to claim 14, wherein:
the elastic part includes a plurality of connecting portions connected between the contact plate part and the fixed plate part; and
the plurality of connecting portions is bent at the bending portion.

16. The laser apparatus according to claim 15, wherein the preliminary ionization outer electrode further includes a gap provided between the elastic part and the additional elastic part.

17. The laser apparatus according to claim 12, wherein the additional elastic part is formed by laminating a plurality of flat springs.

18. The preliminary ionization discharge device according to claim 17, wherein the plurality of flat springs is made of brass.

* * * * *